US009806936B2

United States Patent
Xiu

(10) Patent No.: US 9,806,936 B2
(45) Date of Patent: Oct. 31, 2017

(54) METHOD, APPARATUS, AND SYSTEM FOR CONTROLLING A COMPUTER DEVICE THROUGH A MOBILE TERMINAL

(71) Applicant: TENCENT TECHNOLOGY (SHENZHEN) COMPANY LIMITED, Shenzhen (CN)

(72) Inventor: Yu Xiu, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 27 days.

(21) Appl. No.: 14/717,367

(22) Filed: May 20, 2015

(65) Prior Publication Data

US 2015/0256382 A1 Sep. 10, 2015

Related U.S. Application Data

(63) Continuation of application No. PCT/CN2013/086819, filed on Nov. 11, 2013.

(30) Foreign Application Priority Data

Nov. 26, 2012 (CN) .......................... 2012 1 0486518

(51) Int. Cl.
*G06F 21/56* (2013.01)
*H04L 12/24* (2006.01)
(Continued)

(52) U.S. Cl.
CPC .......... *H04L 41/046* (2013.01); *G06F 21/305* (2013.01); *G06F 21/56* (2013.01);
(Continued)

(58) Field of Classification Search
CPC ...................................................... H04W 4/14
See application file for complete search history.

(56) References Cited

U.S. PATENT DOCUMENTS

2007/0242646 A1* 10/2007 Matsui ................ H04L 67/2861
370/338
2010/0273450 A1* 10/2010 Papineau .................. G06F 8/60
455/411

(Continued)

FOREIGN PATENT DOCUMENTS

CN 1525723 A 9/2004
CN 1677382 A 10/2005
(Continued)

OTHER PUBLICATIONS

Chinese Office Action for Application No. 2012104865181 dated Mar. 4, 2016, and an English concise explanation of relevance thereof.

(Continued)

*Primary Examiner* — Farid Homayounmehr
*Assistant Examiner* — Zhimei Zhu
(74) *Attorney, Agent, or Firm* — Harness, Dickey & Pierce, P.L.C.

(57) ABSTRACT

A control center receives a control instruction sent from a mobile terminal, forwards the control instruction to a computer device associated with the mobile terminal, and the computer device calls an execution module to execute the control instruction.

16 Claims, 7 Drawing Sheets

(51) Int. Cl.
*G06F 21/30* (2013.01)
*H04W 4/14* (2009.01)
*H04L 29/06* (2006.01)
*H04W 4/00* (2009.01)

(52) U.S. Cl.
CPC ........ *H04L 63/145* (2013.01); *H04L 63/1433* (2013.01); *H04W 4/14* (2013.01); *H04L 41/048* (2013.01); *H04W 4/00* (2013.01)

(56) References Cited

U.S. PATENT DOCUMENTS

| | | | | |
|---|---|---|---|---|
| 2010/0309510 | A1* | 12/2010 | Hansen | G06F 3/1203 358/1.15 |
| 2011/0258332 | A1* | 10/2011 | Fan | H04W 4/00 709/228 |
| 2012/0089921 | A1* | 4/2012 | Bellini | G06F 3/002 715/740 |
| 2012/0178536 | A1* | 7/2012 | Oh | H04L 12/1822 463/42 |
| 2012/0278174 | A1* | 11/2012 | Seo | G06Q 30/02 705/14.59 |
| 2013/0165129 | A1* | 6/2013 | Koren | H04L 67/146 455/440 |
| 2014/0115652 | A1* | 4/2014 | Kapoor | G06F 21/554 726/1 |

FOREIGN PATENT DOCUMENTS

| | | |
|---|---|---|
| CN | 1794212 A | 6/2006 |
| CN | 1801047 A | 7/2006 |
| CN | 101131723 A | 2/2008 |
| CN | 102420723 A | 4/2012 |
| CN | 102748836 A | 10/2012 |

OTHER PUBLICATIONS

International Preliminary Report for Application No. PCT/CN2013/086819, dated Jun. 4, 2015.
International Search Report for International Application No. PCT/CN2013/086819, dated Feb. 20, 2014.
Chinese Office Action for Application No. 2012104865181 dated Aug. 2, 2016, and an English concise explanation of relevance thereof.

* cited by examiner

METHOD, APPARATUS, AND SYSTEM FOR CONTROLLING A COMPUTER DEVICE THROUGH A MOBILE TERMINAL

CROSS-REFERENCE TO RELATED APPLICATIONS

This application is a continuation of International Application No. PCT/CN2013/086819, filed Nov. 11, 2013. This application claims the benefit and priority of Chinese Application No. 201210486518.1, filed Nov. 26, 2012. The entire disclosures of each of the above applications are incorporated herein by reference.

FIELD

The present disclosure relates to a method, apparatus, and system for controlling a computer device through a mobile terminal.

BACKGROUND

This section provides background information related to the present disclosure which is not necessarily prior art.

A simple and convenient channel is provided through mobile terminals for a user to quickly obtain a message. Users often perform daily tasks through a mobile terminal. At the same time, the security of computer devices becomes an issue which cannot be ignored since the user cannot control the computer device anywhere and at any time.

SUMMARY

This section provides a general summary of the disclosure, and is not a comprehensive disclosure of its full scope or all of its features.

According to various embodiments of the present disclosure, a method, apparatus, and system for controlling a computer device through a mobile terminal are provided, so that a user can conveniently control the computer device anywhere and anytime.

According to various embodiments, a computer-implemented method for controlling a computer device through a mobile terminal is provided. The method includes:

storing, by a control center, terminal information that uniquely identifies a mobile terminal and storing device information that uniquely identifies a computer device;

storing, by the control center, a correspondence relationship between the terminal information and the device information so as to associate the mobile terminal with the computer device;

receiving, by the control center, a first instruction sent from the mobile terminal; wherein the first instruction controls the computer device; and forwarding, by the control center according to the correspondence relationship, the first instruction to the computer device, so that the computer device calls a first execution module to execute the first instruction, generates an execution result, and sends the execution result to the control center.

According to various embodiments, an apparatus for controlling a computer device through a mobile terminal is provided. The apparatus includes:

a storage module, to store terminal information that uniquely identifies a mobile terminal, to store device information that uniquely identifies a computer device, and to store a correspondence relationship between the terminal information and the device information so as to associate the mobile terminal with the computer device;

a receiving module, to receive a first instruction sent from the mobile terminal; wherein the first instruction controls the computer device; and a forwarding module, to forward the first instruction to the computer device according to the correspondence relationship, so that the computer device calls a first execution module to execute the first instruction, generates an execution result, and sends the execution result to the control center.

According to various embodiments, a system for controlling a computer device through a mobile terminal is provided. The system includes:

a first transceiver module, embedded in a mobile terminal, to send a control instruction to a control center;

a second transceiver module, embedded in the control center, to forward the control instruction to a computer device; and, an execution module, embedded in the computer device, to receive and execute the control instruction.

According to various embodiments, a method, apparatus, and system for controlling a computer device through a mobile terminal are provided. According to various embodiments, a control center receives a control instruction sent from a mobile terminal, forwards the control instruction to a computer device associated with the mobile terminal, and the computer device calls an execution module to execute the control instruction. Through the foregoing methods, a user can conveniently control the computer device anywhere and at any time.

Further areas of applicability will become apparent from the description provided herein. The description and specific examples in this summary are intended for purposes of illustration and are not intended to limit the scope of the present disclosure.

DRAWINGS

The drawings described herein are for illustrative purposes of selected embodiments and not all possible implementations, and are not intended to limit the scope of the present disclosure.

Features of the present disclosure are illustrated by way of example and are not limited in the following figures, in which like numerals indicate like elements, in which.

Corresponding reference numerals indicate corresponding parts throughout the several views of the drawings.

DETAILED DESCRIPTION

Example embodiments will now be described more fully with reference to the accompanying drawings.

Hereinafter, the present disclosure will be described in further detail with reference to the accompanying drawings and examples.

For simplicity and illustrative purposes, the present disclosure is described by referring to various embodiments. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

According to various embodiments, when a user leaves his home, a computer in the home is still powered up and in an idle state. Presently, antivirus software installed on the computer may provide an alarm if the computer is attacked or infected with a computer virus. However, the user is not always able to process the alarm immediately because the computer may not always be available for the user, which may cause great dangers and immeasurable losses to the security of user data.

According to various embodiments, a method, apparatus, and system for controlling a computer device through a mobile terminal are provided. According to various embodiments, a control center receives a control instruction sent from a mobile terminal, forwards the control instruction to a computer device associated with the mobile terminal, and the computer device calls an execution module to execute the control instruction. Through the foregoing methods, a user can conveniently control the computer device anywhere and at any time.

Figure 1A:
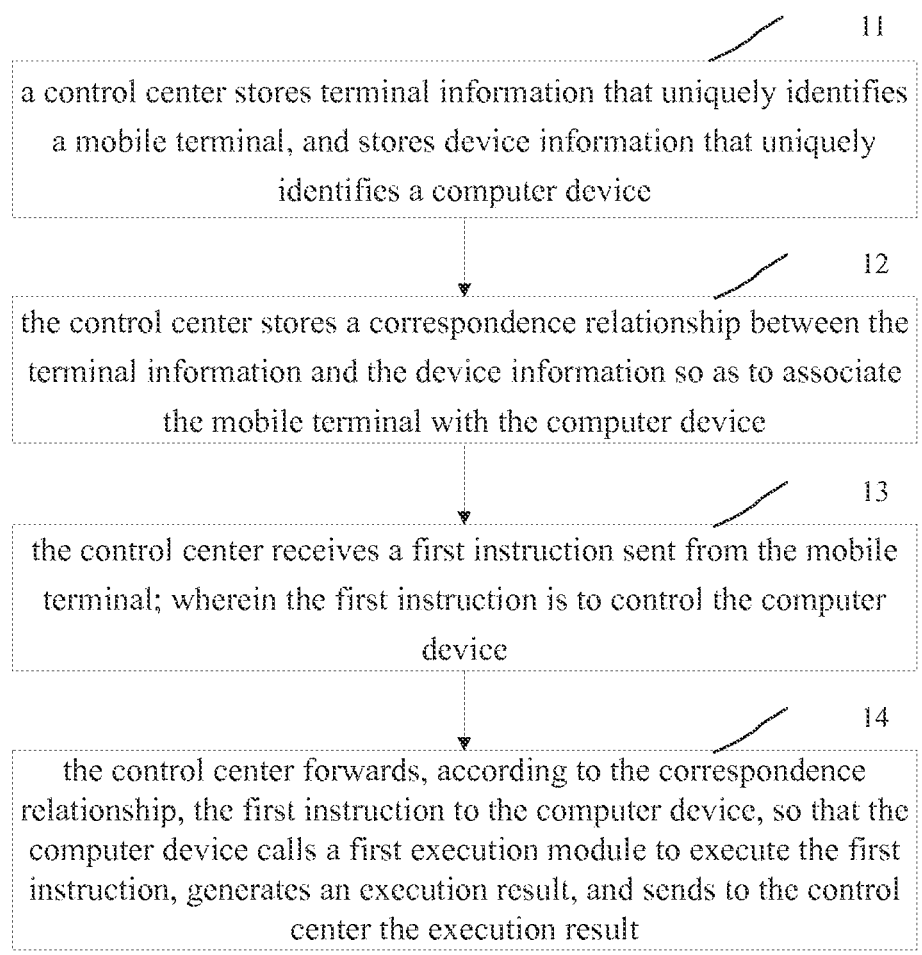
FIG. 1A is a flowchart illustrating a method for controlling a computer device through a mobile terminal according to various embodiments.

FIG. 1A is a flowchart illustrating a method for controlling a computer device through a mobile terminal according to various embodiments. FIG. 1A is a simplified diagram according to various embodiments. This diagram is an example, which should not unduly limit the scope of the claims. As shown in FIG. 1A, the method may include the various processes.

Block 11: A control center stores terminal information that uniquely identifies a mobile terminal and stores device information that uniquely identifies a computer device.

Block 12: The control center stores a correspondence relationship between the terminal information and the device information so as to associate the mobile terminal with the computer device.

Block 13: The control center receives a first instruction sent from the mobile terminal; wherein the first instruction controls the computer device.

Block 14: The control center forwards, according to the correspondence relationship, the first instruction to the computer device, so that the computer device calls a first execution module to execute the first instruction, generates an execution result, and sends the execution result to the control center.

Figure 1B:
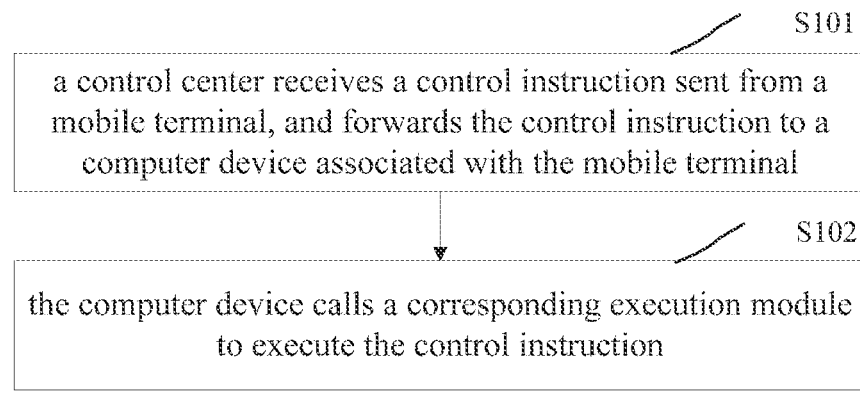
FIG. 1B is a flowchart illustrating a method for controlling a computer device through a mobile terminal according to various embodiments.

FIG. 1B is a flowchart illustrating a method for controlling a computer device through a mobile terminal according to various embodiments. FIG. 1B is a simplified diagram according to various embodiments. This diagram is an example, which should not unduly limit the scope of the claims. As shown in FIG. 1B, the method may include the various processes.

Block S101: A control center receives a control instruction sent from a mobile terminal and forwards the control instruction to a computer device associated with the mobile terminal.

Figure 2:
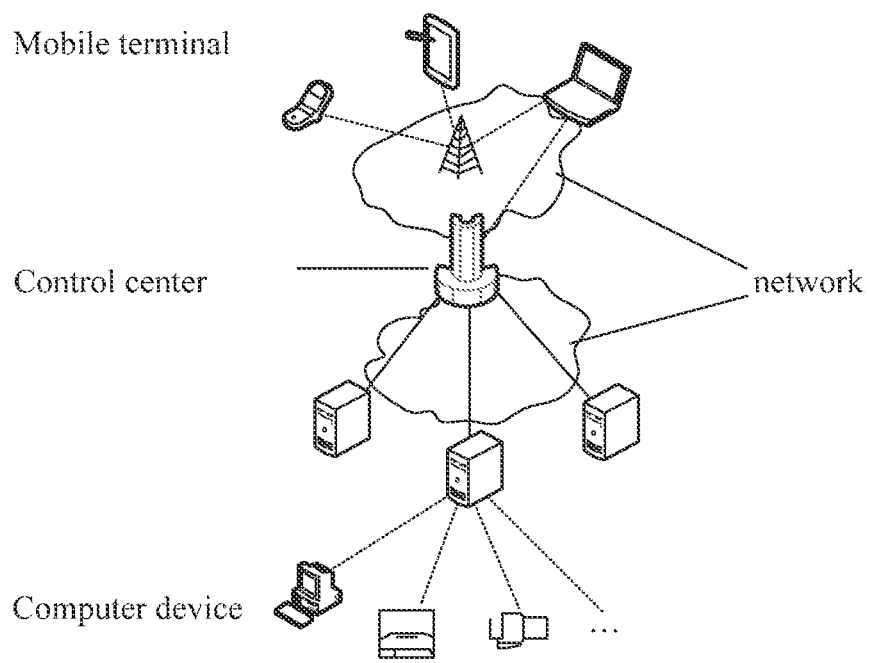
FIG. 2 is a diagram illustrating a system employing the method for controlling a computer device through a mobile terminal according to various embodiments.

According to various embodiments, the control center receives the control instruction sent from the mobile terminal, wherein the control instruction may be an antivirus instruction, a power-up instruction or a power-down instruction, or an audio and/or video instruction. According to various embodiments, the control center may be a cloud control center, which may include a plurality of cloud servers. The cloud control center may send, using a cloud server, a cloud command to some clients on the computer device and the mobile terminal. After receiving the cloud command, the clients analyze and execute the command. A basic control process may include the control center (e.g., a cloud server) sending a command to an application on a controlled device→the controlled device executing the command, as shown in FIG. 2. The control center then forwards the control instruction to the computer device associated with the mobile terminal. According to various embodiments, the computer device may be a personal computer (PC), a server, or a portable computer (such as a laptop computer, a tablet computer, etc.).

According to various embodiments, terminal information that uniquely identifies the mobile terminal is obtained and uploaded to the control center and device information that uniquely identifies the computer device is obtained and uploaded to the control center. The control center stores the terminal information and the device information that has been uploaded and stores a correspondence relationship between the terminal information and the device information so as to associate the terminal information with the device information, so that the mobile terminal may be associated with the computer device to be controlled by the mobile terminal. In this case, the device information and the terminal information may be any one of a mobile terminal number registered in the control center, an instant messaging (IM) account, and a user e-mail address. For example, a mobile terminal number 186**9689 is obtained and uploaded to the control center as registration information of a mobile terminal, i.e., the terminal information of the mobile terminal, and information of a computer device which is uniquely identified by the mobile terminal number 1869689 is obtained and uploaded to the control center as registration information of the computer device, i.e., the device information of the computer device, and the computer device is associated with the mobile terminal through the mobile terminal number 186**9689.

Block S102: The computer device calls a corresponding execution module to execute the control instruction. According to various embodiments, the computer device calls, in response to receiving the control instruction, the corresponding execution module to execute the control instruction received. When the control instruction is an antivirus instruction, the computer device may call an antivirus module to perform an antivirus operation. When the control instruction is a power-down instruction, the computer device may call a power-down module to perform a power-down operation.

Figure 3:
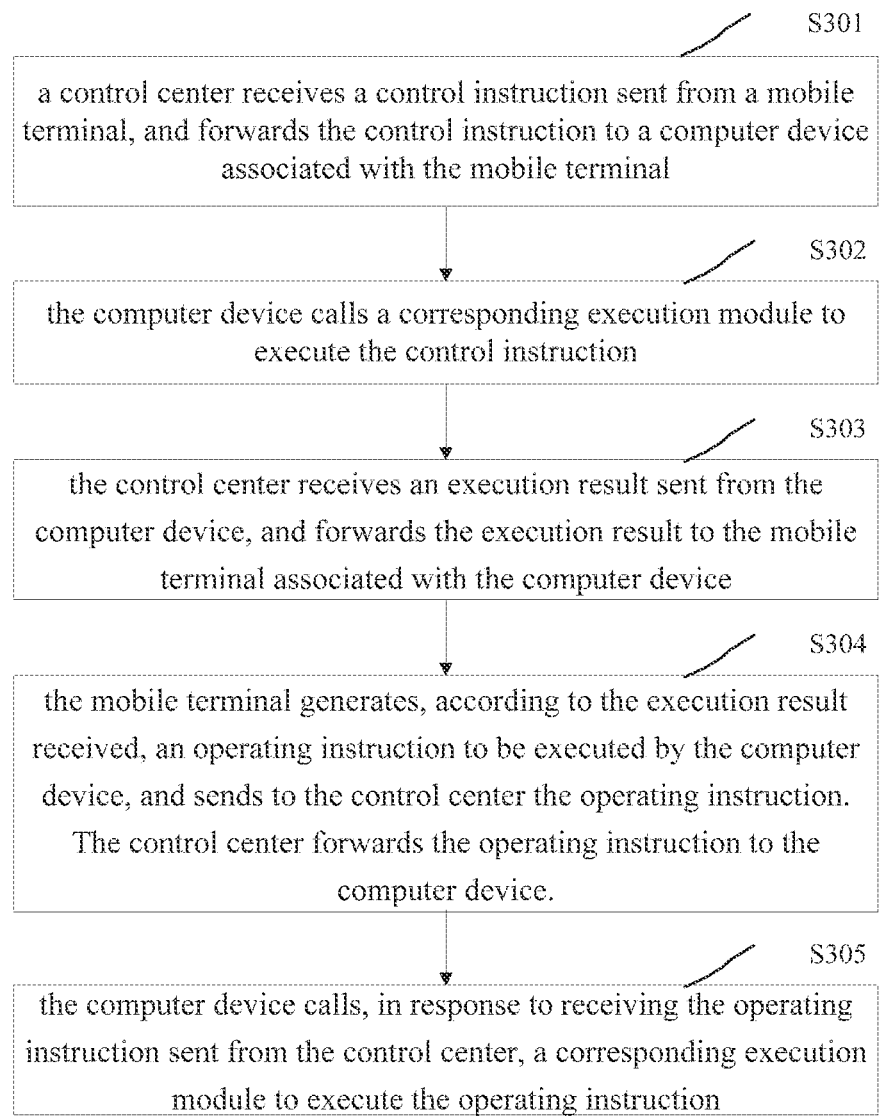
FIG. 3 is a flowchart illustrating a method for controlling a computer device through a mobile terminal according to various embodiments.

FIG. 3 is a flowchart illustrating a method for controlling a computer device through a mobile terminal according to various embodiments. FIG. 3 is a simplified diagram according various embodiments. This diagram is an example, which should not unduly limit the scope of the claims. Through the method shown in FIG. 3, processes in the first two blocks S301 and S302 are the same as those in blocks S101 and S102 described above, respectively. As shown in FIG. 3, the method may further include the various processes.

Block S303: The control center receives an execution result sent from the computer device and forwards the execution result to the mobile terminal associated with the computer device.

The execution module described above may generate an execution result after executing the control instruction. At this time, the computer device sends the execution result to the control center and the control center then forwards the execution result to the mobile terminal associated with the computer device. Therefore, the execution result generated by the computer device is returned to a user of the mobile terminal. For example, after the antivirus instruction is executed and there is not any Trojan found during the process of performing the antivirus instruction, an execution result expressed as "the computer is in a safe state" may be generated. The computer device may send the execution result to the control center and the control center may forward the execution result to the mobile terminal; therefore, the execution result, which is expressed as "the computer is in a safe state", is returned to the user of the mobile terminal. In another example, when a Trojan is found during the process of performing the antivirus instruction and an execution result expressed as "a Trojan is found" may be generated; the computer device may send to the control center the execution result together with an expression of "how to handle", which may be forwarded by the control center to the mobile terminal; therefore, an execution result, which is expressed as "a Trojan is found, how to handle", may be returned to the user of the mobile terminal. In another example, after the power-down instruction is executed and there is not any document to be saved or program to be exited during the power-down process, an execution result expressed as "the computer is powered down" may be generated, the computer device may send to the control center the execution result, and the control center may forward the execution result to the mobile terminal; therefore, the execution result, which is expressed as "the computer is powered down", may be returned to the user of the mobile terminal.

Block S304: the mobile terminal generates, according to the execution result received, an operating instruction to be executed by the computer device and sends the operating instruction to the control center. The control center forwards the operating instruction to the computer device.

According to various embodiments, when the execution result forwarded by the control center is received by the mobile terminal, the user of the mobile terminal may perform, according to the execution result received, a corresponding operation at the mobile terminal to determine an operation to be executed by the computer device. The mobile terminal may receive the determined operation, generate the corresponding operating instruction according to the determined operation, and send to the control center the operating instruction. For example, after the user determines to perform a "Quarantine" operation according to the received execution result, which is expressed as "a Trojan is found, how to handle", the mobile terminal may generate an operating instruction, e.g., a "Quarantine" operating instruction according to the "Quarantine" operation determined, and send to the control center the "Quarantine" operating instruction. The control center may forward the "Quarantine" operating instruction to the computer device.

Block S305: The computer device calls, in response to receiving the operating instruction sent from the control center, a corresponding execution module to execute the operating instruction. According to various embodiments, the computer device may call, in response to receiving the operating instruction sent from the control center, the corresponding execution module to execute the operating instruction. For example, the computer device receives the "Quarantine" operating instruction, and calls the antivirus module to perform the "Quarantine" operating instruction.

Figure 4:
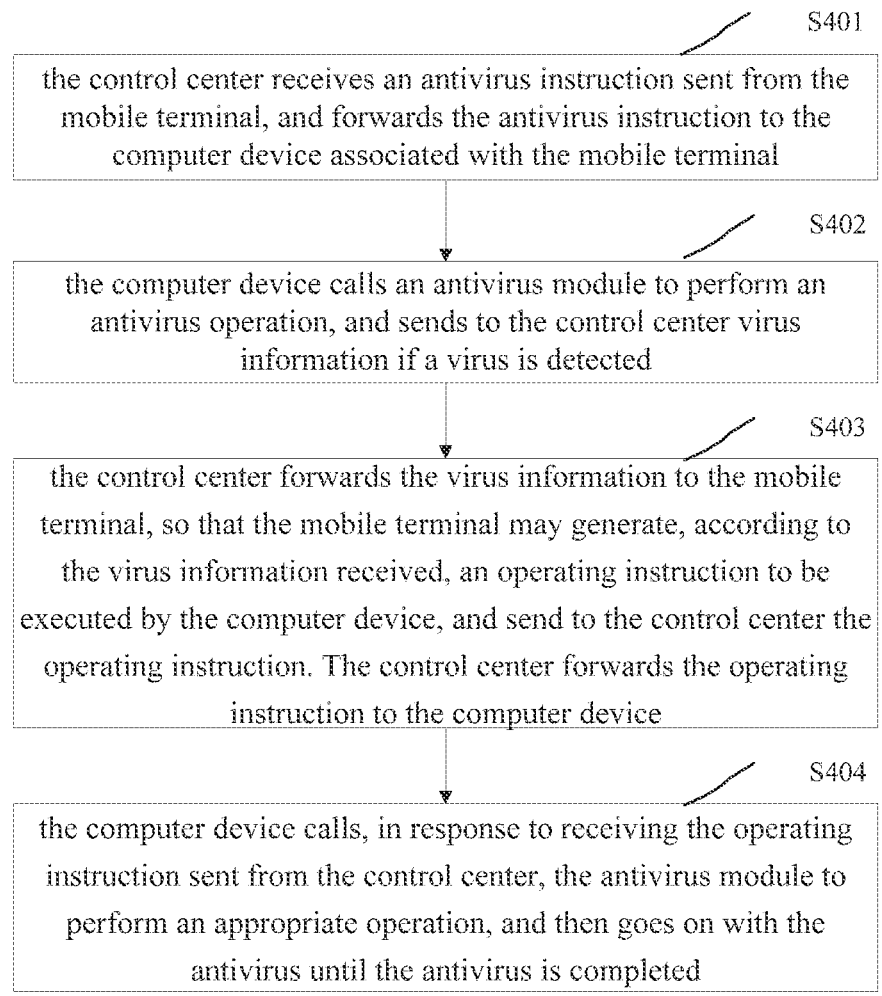
FIG. 4 is a flowchart illustrating a method for controlling a computer device through a mobile terminal according to various embodiments.

According to various embodiments, the method described above may be applied to computer security. FIG. 4 is a flowchart illustrating a method for controlling, through a mobile terminal, a computer device to perform antivirus operation according to various embodiments. FIG. 4 is a simplified diagram according to various embodiments. This diagram is an example, which should not unduly limit the scope of the claims. As shown in FIG. 4, the method may include the various processes.

Block S401: The control center receives an antivirus instruction sent from the mobile terminal and forwards the antivirus instruction to the computer device associated with the mobile terminal. According to various embodiments, an antivirus control module may be installed on the mobile terminal (such as a mobile phone, a Personal Digital Assistant (PDA), etc.). Once a user of the mobile terminal calls the antivirus control module, the mobile terminal may be connected to the control center in a wireless manner, as shown in FIG. 2. In this case, the mobile terminal sends the antivirus instruction to the control center. The control center receives the antivirus instruction sent from the mobile terminal and forwards the antivirus instruction to the computer device associated with the mobile terminal (e.g., a PC).

In this case, the control center may be a cloud control center. The cloud control center may send a cloud command to some clients on the computer device and the mobile terminal. After receiving the cloud command, the clients analyze and execute the command. A basic control process may be that the cloud control center sends a cloud command to an application on a controlled device→the controlled device executes the cloud command.

According to various embodiments, in order to associate the mobile terminal with the computer device, device information that uniquely identifies the computer device is obtained and uploaded to the control center and terminal information that uniquely identifies the mobile terminal is obtained and uploaded to the control center. The control center stores the terminal information and the device information uploaded and stores a correspondence relationship between the terminal information and the device information so as to associate the terminal information with the device information, so that the mobile terminal may be associated with the computer device to be controlled by the mobile terminal. In this case, the device information and the terminal information may be any one of a mobile terminal number registered in the control center, an IM account, a user e-mail address, and a serial number of the antivirus module.

For example, an IM account, e.g., a QQ account, is accessed at a computer device such as a PC. In this case, the computer device may be associated with a mobile terminal as long as the same QQ account is logged in at the mobile terminal. In other words, the computer device is associated with the mobile terminal through the QQ account.

Block S402: The computer device calls an antivirus module to perform an antivirus operation and sends virus information to the control center if a virus is detected. According to various embodiments, the computer device is connected to the control center when the antivirus module on the computer device is called. Meanwhile, the antivirus module is configured to perform the antivirus operation. If the antivirus module detects the virus, the computer device may send to the control center the virus information.

Block S403: The control center forwards the virus information to the mobile terminal so that the mobile terminal may generate, according to the virus information received, an operating instruction to be executed by the computer device and send to the control center the operating instruction. The control center then forwards the operating instruction to the computer device. According to various embodiments, a communication system may include a Push Notification Server (PNS), such as a mobile terminal using an iOS operating system. In this case, the control center may send to the PNS the virus information and the terminal information, wherein the terminal information of the mobile terminal is registered in the PNS. The PNS sends, according to the terminal information registered in the PNS, the virus information to the mobile terminal corresponding to the terminal information. The antivirus control module installed on the mobile terminal may then generate, according to the virus information received, an operating instruction (e.g., Delete, Quarantine, or Skip) to be executed by the computer device and send to the control center the operating instruction.

Herein, notification systems which are commonly used in mobile terminals (represented by iPhone and Blackberry) are introduced briefly, taking a PNS with an iPhone version (i.e., Apple Push Notification Service, APNS) and the instant messaging tool QQ as examples. When a user closes the QQ of the user, but at this time another user sends a message to the QQ of the user, a Push service may be triggered. A notification process may be divided into three phases. At the first phase, a QQ server sends the message to be sent to the APNS and an identifier of a destination iPhone. At the second phase, the APNS searches a list of iPhones that have already registered the Push service on the APNS for the destination iPhone with the identifier and sends the message to the destination iPhone. At the third phase, the destination iPhone sends the message received to a corresponding application and pops up a Push notification according to configuration.

Block S404: The computer device calls, in response to receiving the operating instruction sent from the control center, the antivirus module to perform an appropriate operation, and then goes on with the antivirus until the antivirus is completed. According to various embodiments, when the computer device receives a "Delete" operating instruction sent from the control center, the antivirus module is called to perform a "Delete" operation. In another example, when the computer device receives a "Quarantine" operating instruction sent from the control center, the antivirus module is called to perform a "Quarantine" operation. After performing the appropriate operation such as the "Delete" operation or the "Quarantine" operation, the computer device continues with the antivirus until the antivirus is completed.

As described above, according to various embodiments, an uplink may be that the mobile terminal sends an antivirus instruction (e.g., killing a Trojan)→the control center→the computer device calls the antivirus module, and a downlink may be that the antivirus module sends virus information (e.g., a Trojan is found)→the control center→the PNS→the mobile terminal.

According to various embodiments, the method described above may be applied to a mobile terminal without a notification system, such as a mobile terminal employing a Symbian system or an Android system. According to various embodiments, the uplink may be that the mobile terminal sends a control instruction→the control center→the computer device calls an execution module to perform the control instruction, but in the downlink, a notification is obtained by a service running in the background. The antivirus control module installed on the mobile terminal queries the control center to determine whether there is virus information sent from the computer device associated with the mobile terminal. According to various embodiments, the antivirus control module may send a query message to the control center to query whether there is the virus information sent from the computer device. The control center sends the virus information to the mobile terminal if there is the virus information. In this case, the antivirus control module may generate, according to the virus information received, an operating instruction to be executed by the computer device and send to the control center the operating instruction.

For example, after the mobile terminal calls the antivirus control module, the service running in the background queries the control center every two minutes to determine whether there is a notification sent from the computer device associated with the mobile terminal. A prompt box appears in response to determining that there is the notification to ask a user how to handle, otherwise, does not perform any processing.

According to various embodiments, the method described above may be applied to a non-intelligent mobile terminal. The control of a computer device may be implemented in the form of a short message, rather than through machine readable instructions. The mobile terminal may send to a Short Messaging Service (SMS) accessing server the antivirus instruction in the form of a short message. The SMS accessing server may send the antivirus instruction to the control center and the control center may forward the antivirus instruction to a computer device associated with the mobile terminal. The computer device may call the antivirus module to perform the antivirus instruction and send virus information to the control center. The control center may send to a SMS transmitting server the virus information and the terminal information of the mobile terminal. The SMS transmitting server may send, according to the terminal information, the virus information to the mobile terminal corresponding to the terminal information. In this case, the antivirus control module installed on the mobile terminal may generate, according to the virus information received, an operating instruction to be executed by the computer device and send to the SMS accessing server the operating instruction. The SMS accessing server may send the operating instruction to the control center and the control center may forward the operating instruction to the computer device associated with the mobile terminal.

As described above, according to various embodiments, the uplink may be that the mobile terminal sends a SMS instruction (e.g., killing a Trojan)→the SMS accessing server→the control center→the computer device calls the antivirus module, and the downlink may be that the antivirus module sends virus information (e.g., a Trojan is found)→the control center→the SMS transmitting server→the mobile terminal.

According to various embodiments, a computer may execute a method, an apparatus, and a system of the present disclosure. The computer may, for example, be a device such as a personal desktop computer or a portable device, such as a laptop computer, a tablet computer, etc. The computer may include a processor coupled to memory storing machine readable instructions for execution by the processor to perform all or part of the processes described above.

Figure 5:
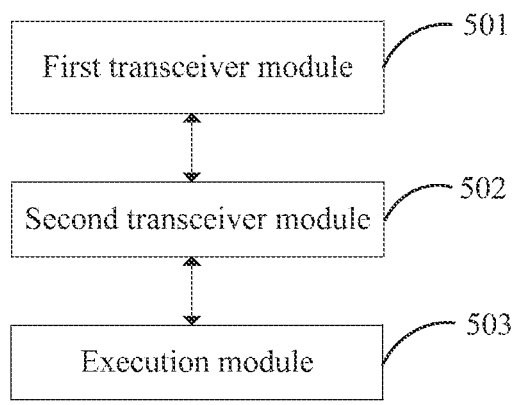
FIG. 5 is a diagram illustrating a structure of a system for controlling a computer device through a mobile terminal according to various embodiments.

FIG. 5 is a diagram illustrating a structure of a system for controlling a computer device through a mobile terminal according to various embodiments. FIG. 5 is a simplified diagram according to one example of the present disclosure. This diagram is an example which should not unduly limit the scope of the claims. As shown in FIG. 5, the system may include a first transceiver module 501 embedded in a mobile terminal, a second transceiver module 502 embedded in a control center, and an execution module 503 embedded in a computer device. The first transceiver module 501 may be configured to send a control instruction to the control center. The second transceiver module 502 may be configured to forward the control instruction to the computer device. The execution module 503 may be configured to receive and execute the control instruction. In addition, both the first transceiver module 501 and the execution module 503 may be integrated in a client of an IM tool or a software management tool to facilitate the installation and usage of users.

Based on the above description, various embodiments further provide an apparatus for controlling a computer device through a mobile terminal.

Figure 6A:
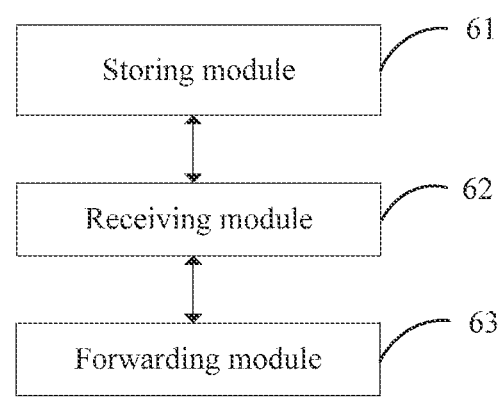
FIG. 6A is a diagram illustrating a structure of an apparatus for controlling a computer device through a mobile terminal according to various embodiments.

FIG. 6A is a diagram illustrating a structure of the apparatus for controlling a computer device through a mobile terminal according to various embodiments. The apparatus shown in FIG. 6A may be applied to the control center described above. FIG. 6A is a simplified diagram according to various embodiments. This diagram is an example which should not unduly limit the scope of the claims. As shown in FIG. 6A, the apparatus may include:

a storage module 61, configured to store terminal information that uniquely identifies a mobile terminal, store device information that uniquely identifies a computer device, and store a correspondence relationship between the terminal information and the device information so as to associate the mobile terminal with the computer device;

a receiving module 62, configured to receive a first instruction sent from the mobile terminal; wherein the first instruction controls the computer device; and a forwarding module 63, configured to forward the first instruction to the computer device according to the correspondence relationship, so that the computer device calls a first execution module to execute the first instruction, generates an execution result, and sends the execution result to the control center.

According to various embodiments, the receiving module 62 is further configured to receive the execution result sent from the computer device and receive a second instruction sent from the mobile terminal, wherein the second instruction controls the computer device. The forwarding module 63 is further configured to forward the execution result received by the receiving module to the mobile terminal, so that the mobile terminal generates the second instruction based on the execution result, sends the second instruction to the apparatus, and forwards the second instruction received by the receiving module to the computer device, so that the computer device calls a second execution module to execute the second instruction.

According to various embodiments, the first instruction may be an antivirus instruction. In this case, the receiving module 62 is configured to receive the antivirus instruction sent from the mobile terminal, receive virus information sent from the computer device, and receive a second instruction sent from the mobile terminal, wherein the second instruction controls the computer device. The forwarding module 63 is configured to forward the antivirus instruction received by the receiving module to the computer device so that the computer device calls an antivirus module configured on the computer device to execute the antivirus instruction and sends the virus information to the apparatus when a virus is detected during a process of executing the antivirus instruction. The forwarding module 63 then forwards the virus information received by the receiving module to the mobile terminal so that the mobile terminal generates the second instruction based on the virus information received, sends the second instruction to the apparatus, forwards the second instruction received by the receiving module to the computer device so that the computer device calls the antivirus module to execute the second instruction, and continues the instruction until the antivirus is completed.

According to various embodiments, an antivirus control module may be configured on the mobile terminal, the mobile terminal may be connected to the apparatus in a wireless manner when the antivirus control module configured on the mobile terminal is called, and the computer device may be connected to the apparatus when the antivirus module configured on the computer device is called.

According to various embodiments, the device information and the terminal information may be any one of a mobile terminal number registered in the control center, an instant messaging account, an e-mail address, and a serial number of the antivirus module.

Figure 6B:
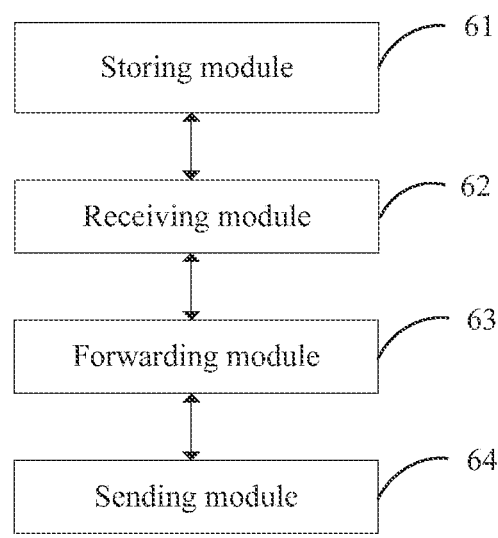
FIG. 6B is a diagram illustrating a structure of an apparatus for controlling a computer device through a mobile terminal according to various embodiments.

According to various embodiments, as shown in FIG. 6B, the apparatus may further include a sending module 64 configured to send the virus information and the terminal information to a Push Notification Server (PNS), so that the PNS sends the virus information to the mobile terminal according to the terminal information, the antivirus control module configured on the mobile terminal generates the second instruction based on the virus information, and sends the second instruction to the apparatus.

According to various embodiments, the receiving module 62 may be configured to receive a query message sent from the antivirus control module regarding whether there is the virus information sent from the computer device. The forwarding module 63 may be configured to forward the virus information to the mobile terminal if there is the virus information so that the antivirus control module configured on the mobile terminal generates the second instruction based on the virus information and sends the second instruction to the apparatus.

According to various embodiments, the antivirus instruction may be sent by the mobile terminal to a Short Messaging Service (SMS) accessing server in the form of a short message and the SMS accessing server sends the antivirus instruction to the control center. In this case, the receiving module 62 is configured to receive the antivirus instruction sent from the SMS accessing server and receive the second instruction sent from the SMS accessing server. The forwarding module 63 is configured to forward the antivirus instruction to the computer device. The sending module 64 is configured to send the virus information and the terminal information to a SMS transmitting server so that the SMS transmitting server sends the virus information to the mobile terminal according to the terminal information, the antivirus control module configured on the mobile terminal generates the second instruction based on the virus information, and sends the second instruction to the SMS accessing server, and the SMS accessing server sends the second instruction to the apparatus.

According to various embodiments, the first instruction may be a power-down instruction. In this case, the receiving module 62 is configured to receive the power-down instruction sent from the mobile terminal. The forwarding module 63 is configured to forward the power-down instruction received by the receiving module to the computer device so that the computer device calls a power-down module configured on the computer device to perform the power-down instruction.

The above-mentioned modules may be software (e.g. machine readable instructions stored in a computer readable medium and executable by a processor), hardware (e.g. the processor of an Application Specific Integrated Circuit (ASIC)), or a combination thereof.

The above-mentioned modules according to various embodiments may be deployed in either a centralized or a distributed configuration and may be merged into either a single module or further split into a plurality of sub-modules.

Figure 7A:
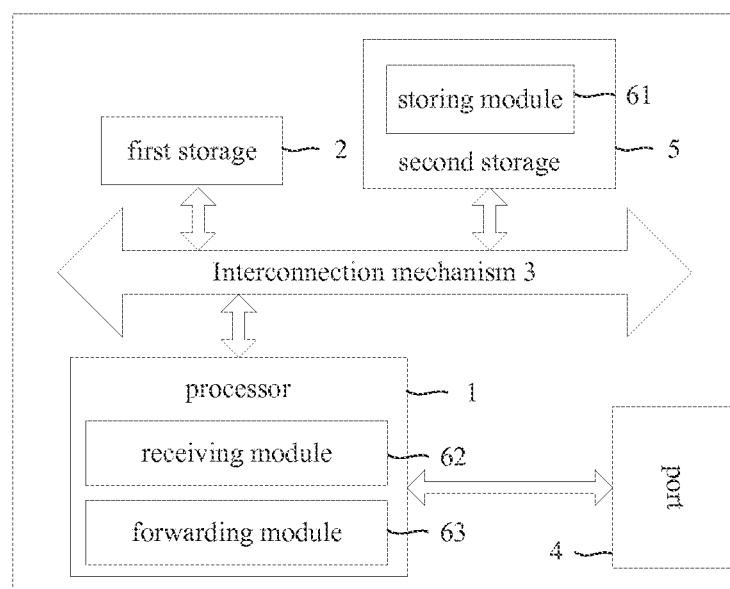
FIG. 7A is a diagram illustrating a hardware structure of an apparatus for controlling a computer device through a mobile terminal according to various embodiments.

FIG. 7A is a diagram illustrating a hardware structure of the apparatus for controlling a computer device through a mobile terminal according to various embodiments. FIG. 7A is a simplified diagram according to various embodiments. This diagram is an example, which should not unduly limit the scope of the claims. As shown in FIG. 7A, the apparatus may include a processor 1, a first storage 2, an interconnection mechanism 3, at least one port 4, and a second storage 5. In this case, the processor 1, the first storage 2, the at least one port 4, and the second storage 5 are connected via the interconnection mechanism 3 and the apparatus may transmit and receive data information through the at least one port 4.

According to various embodiments, the storage 2 can store machine readable instructions. The processor 1 can execute the machine readable instructions to store, in the second storage 5, terminal information that uniquely identifies a mobile terminal, store device information that uniquely identifies a computer device, and store a correspondence relationship between the terminal information and the device information so as to associate the mobile terminal with the computer device to receive a first instruction sent from the mobile terminal, wherein the first instruction controls the computer device, and forwards the first instruction to the computer device according to the correspondence relationship so that the computer device calls a first execution module to execute the first instruction, generates an execution result, and sends the execution result to the control center.

According to various embodiments, the processor 1 can execute the machine readable instructions stored in the first storage 2 to perform all or part of the processes described in the aforementioned method examples, which are not repeated herein.

Figure 7B:
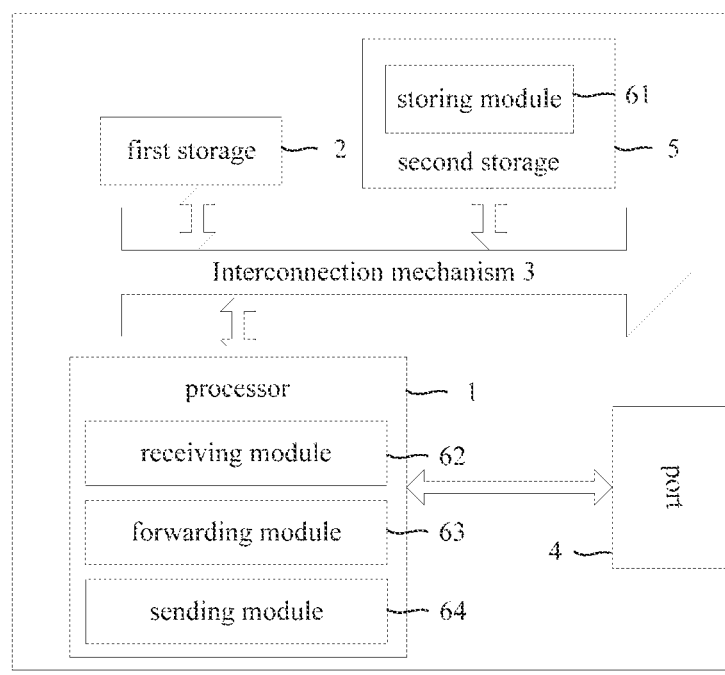
FIG. 7B is a diagram illustrating a hardware structure of an apparatus for controlling a computer device through a mobile terminal according to various embodiments.

As can be seen from the above description, when the machine readable instructions stored in the first storage 2 are executed by the processor 1, functions of the aforementioned storing module 61, the receiving module 62, the forwarding module 63, and the sending module 64 are implemented. Therefore, an example of the hardware structure of the apparatus for controlling a computer device through a mobile terminal is shown in FIG. 7B.

It can be seen from the above descriptions that, according to various embodiments, a control center receives a control instruction sent from a mobile terminal, forwards the control instruction to a computer device associated with the mobile terminal, and the computer device calls an execution module to execute the control instruction. In this way, a user can conveniently control the computer device anywhere and anytime.

The above examples can be implemented by hardware, software, firmware or a combination thereof. For example the various methods, processes, and functional units described herein may be implemented by a processor (the term processor is meant to be interpreted broadly to include a CPU, processing unit, ASIC, logic unit, or programmable gate array etc.). The processes, methods, and functional units may all be performed by a single processor or split between several processors; therefore, reference in this disclosure or the claims to a 'processor' should be interpreted to mean 'one or more processors'. The processes, methods, and functional units may be implemented as machine readable instructions executable by one or more processors, hardware logic circuitry of the one or more processors or a combination thereof. Further, the teachings herein may be implemented in the form of a software product. The computer software product is stored in a non-transitory storage medium and comprises a plurality of instructions for making a computer apparatus (which can be a personal computer, a server or a network apparatus such as a router, switch, access point etc.) implement the method recited in the examples of the present disclosure.

Those skilled in the art may understand that all or part of the procedures of the methods of the above examples may be implemented by hardware modules following machine readable instructions. The machine readable instructions may be stored in a computer readable storage medium. When running, the machine readable instructions may provide the procedures of the method examples. The storage medium may be diskette, CD, ROM (Read-Only Memory) or RAM (Random Access Memory), and etc.

The figures are illustrations of examples, wherein the modules or procedure shown in the figures are not necessarily required for implementing the present disclosure. The modules in the aforesaid examples can be combined into one module or further divided into a plurality of sub-modules.

The above are examples of the present disclosure along with some of its variations. The terms, descriptions, and figures used herein are set forth by way of illustration and are not meant as limitations. Many variations are possible within the spirit and scope of the disclosure, which is intended to be defined by the following claims—and their equivalents—in which all terms are meant in their broadest reasonable sense unless otherwise indicated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for controlling a computer device through a mobile terminal, comprising:
storing, by a control center, terminal information that uniquely identifies a mobile terminal, and storing device information that uniquely identifies a computer device;
storing, by the control center, a correspondence relationship between the terminal information and the device information to associate the mobile terminal with the computer device;
receiving, by the control center, a first instruction sent from the mobile terminal; wherein the first instruction is to control the computer device; and,
forwarding, by the control center according to the correspondence relationship, the first instruction to the computer device, wherein in response to receiving the first instruction, the computer device calls a first execution module to execute the first instruction, generates an execution result, and sends the execution result to the control center;
wherein the control center is a cloud server, the terminal information is same as the device information;
wherein the first instruction is an antivirus instruction;
the control center receiving the first instruction sent from the mobile terminal, forwarding the first instruction to the computer device, wherein in response to receiving the first instruction, the computer device calls the first execution module to execute the first instruction, generates an execution result, and sends to the control center the execution result comprises:
receiving, by the control center, the antivirus instruction sent from the mobile terminal, and forwarding the antivirus instruction to the computer device, wherein in response to receiving the antivirus instruction, the computer device calls an antivirus module configured on the computer device to execute the antivirus instruction, and when a virus is detected during a process of executing the antivirus instruction, the antivirus module sends virus information to the control center;
the method further comprising:
receiving, by the control center, the virus information sent from the computer device, and forwarding the virus information to the mobile terminal, wherein in response to receiving the virus information, the mobile terminal generates a second instruction based on the virus information received, and sends the second instruction to the control center; wherein the second instruction is to control the computer device; and,
receiving, by the control center, the second instruction sent from the mobile terminal, and forwarding the second instruction to the computer device, wherein in response to receiving the second instruction, the computer device calls the antivirus module to execute the second instruction, and continues with an antivirus operation until the antivirus operation is completed.

2. The computer-implemented method of claim 1, further comprising:
receiving, by the control center, the execution result sent from the computer device, and forwarding the execution result to the mobile terminal, wherein in response to receiving the execution result, the mobile terminal generates a second instruction based on the execution result, and sends the second instruction to the control center; wherein the second instruction is to control the computer device; and,
receiving, by the control center, the second instruction sent from the mobile terminal, and forwarding the second instruction to the computer device, wherein in response to receiving the second instruction, the computer device calls a second execution module to execute the second instruction.

3. The computer-implemented method of claim 1, wherein an antivirus control module is configured on the mobile terminal;
the mobile terminal is connected to the control center in a wireless manner when the antivirus control module configured on the mobile terminal is called; and
the computer device is connected to the control center when the antivirus module configured on the computer device is called.

4. The computer-implemented method of claim 3, wherein the device information and the terminal information comprise any one of a mobile terminal number registered in the control center, an instant messaging account, an e-mail address, and a serial number of the antivirus module.

5. The computer-implemented method of claim 4, wherein the control center forwarding the virus information to the mobile terminal, wherein the mobile terminal generates a second instruction based on the virus information received, and sends the second instruction to the control center comprises:
sending, by the control center, the virus information and the terminal information to a Push Notification Server (PNS), wherein in response to receiving the virus information and the terminal information, the PNS sends to the mobile terminal the virus information according to the terminal information, and the antivirus control module configured on the mobile terminal generates the second instruction based on the virus information, and sends the second instruction to the control center.

6. The computer-implemented method of claim 4, wherein the control center forwarding the virus information to the mobile terminal, wherein in response to receiving the virus information, the mobile terminal generates a second instruction based on the virus information received, and sends to the control center the second instruction comprises:
receiving, by the control center, a query message sent from the antivirus control module to query whether there is the virus information sent from the computer device;
and,
forwarding, by the control center, the virus information to the mobile terminal if there is the virus information, wherein in response to receiving the virus information, the antivirus control module configured on the mobile terminal generates the second instruction based on the virus information, and sends the second instruction to the control center.

7. The computer-implemented method of claim 4, wherein the antivirus instruction is sent by the mobile terminal to a Short Messaging Service (SMS) accessing server in the form of a short message, and the SMS accessing server sends to the control center the antivirus instruction;
the control center receiving the antivirus instruction sent from the mobile terminal, and forwarding the antivirus instruction to the computer device comprises:
receiving, by the control center, the antivirus instruction sent from the SMS accessing server, and forwarding the antivirus instruction to the computer device;

the control center forwarding the virus information to the mobile terminal, wherein in response to receiving the virus information, the mobile terminal generates a second instruction based on the virus information received, and sends to the control center the second instruction comprises:

sending, by the control center, the virus information and the terminal information to a SMS transmitting server, wherein in response to receiving the virus information and the terminal information, the SMS transmitting server sends to the mobile terminal the virus information according to the terminal information, and the antivirus control module configured on the mobile terminal generates the second instruction based on the virus information, and sends to the SMS accessing server the second instruction, and, the SMS accessing server sends to the control center the second instruction; and, the control center receiving the second instruction sent from the mobile terminal comprises:

receiving, by the control center, the second instruction sent from the SMS accessing server.

8. The computer-implemented method of claim 1, wherein the first instruction is a power-down instruction;

the control center receiving a first instruction sent from the mobile terminal, forwarding the first instruction to the computer device, wherein in response to receiving the first instruction, the computer device calls a first execution module to execute the first instruction comprises:

receiving, by the control center, the power-down instruction sent from the mobile terminal, and forwarding the power-down instruction to the computer device, wherein in response to receiving the power-down instruction, the computer device calls a power-down module configured on the computer device to perform the power-down instruction.

9. An apparatus for controlling a computer device through a mobile terminal, comprising: a storage and a processor; wherein the storage is to store machine readable instructions;
the processor is to execute the machine readable instructions in the storage to:
store terminal information that uniquely identifies a mobile terminal, and store device information that uniquely identifies a computer device, and store a correspondence relationship between the terminal information and the device information to associate the mobile terminal with the computer device;
receive a first instruction sent from the mobile terminal; wherein the first instruction is to control the computer device; and,
forward the first instruction to the computer device according to the correspondence relationship, wherein in response to receiving the first instruction, the computer device calls a first execution module to execute the first instruction, generates an execution result, and sends the execution result to the control center;
wherein the control center is a cloud server, the terminal information is same as the device information;
wherein the first instruction is an antivirus instruction, the processor is further to execute the machine readable instructions in the storage to:
receive the antivirus instruction sent from the mobile terminal; receive virus information sent from the computer device; and, receive a second instruction sent from the mobile terminal; wherein the second instruction is to control the computer device;
forward the antivirus instruction to the computer device, wherein in response to receiving the antivirus instruction, the computer device calls an antivirus module configured on the computer device to execute the antivirus instruction, and when a virus is detected during a process of executing the antivirus instruction, the antivirus module sends the virus information to the apparatus;
forward the virus information to the mobile terminal, wherein in response to receiving the virus information, the mobile terminal generates the second instruction based on the virus information received, and sends the second instruction to the apparatus; and,
forward the second instruction to the computer device, wherein in response to receiving the second instruction, the computer device calls the antivirus module to execute the second instruction, and continues with an antivirus operation until the antivirus operation is completed.

10. The apparatus of claim 9, wherein the processor is further to execute the machine readable instructions in the storage to:
receive the execution result sent from the computer device; and,
receive a second instruction sent from the mobile terminal; wherein the second instruction is to control the computer device;
forward the execution result to the mobile terminal, wherein in response to receiving the execution result, the mobile terminal generates the second instruction based on the execution result, and sends the second instruction to the apparatus; and,
forward the second instruction to the computer device, wherein in response to receiving the second instruction, the computer device calls a second execution module to execute the second instruction.

11. The apparatus of claim 9, wherein an antivirus control module is configured on the mobile terminal;
the mobile terminal is connected to the apparatus in a wireless manner when the antivirus control module configured on the mobile terminal is called; and,
the computer device is connected to the apparatus when the antivirus module configured on the computer device is called.

12. The apparatus of claim 11, wherein the device information and the terminal information comprises any one of a mobile terminal number registered in the control center, an instant messaging account, an e-mail address, and a serial number of the antivirus module.

13. The apparatus of claim 12, wherein the processor is further to execute the machine readable instructions in the storage to:
send the virus information and the terminal information to a Push Notification Server (PNS), wherein in response to receiving the virus information and the terminal information, the PNS sends to the mobile terminal the virus information according to the terminal information, and the antivirus control module configured on the mobile terminal generates the second instruction based on the virus information, and sends the second instruction to the apparatus.

14. The apparatus of claim 12, wherein the processor is further to execute the machine readable instructions in the storage to:

receive a query message sent from the antivirus control module to query whether there is the virus information sent from the computer device; and, forward the virus information to the mobile terminal if there is the virus information, wherein in response to receiving the virus information, the antivirus control module configured on the mobile terminal generates the second instruction based on the virus information, and sends the second instruction to the apparatus.

15. The apparatus of claim 12, wherein the antivirus instruction is sent by the mobile terminal to a Short Messaging Service (SMS) accessing server in the form of a short message, and the SMS accessing server sends to the control center the antivirus instruction; the processor is further to execute the machine readable instructions in the storage to:

receive the antivirus instruction sent from the SMS accessing server, and receive the second instruction sent from the SMS accessing server;

forward the antivirus instruction to the computer device; and, send the virus information and the terminal information to a SMS transmitting server, wherein in response to receiving the virus information and the terminal information, the SMS transmitting server sends to the mobile terminal the virus information according to the terminal information, and the antivirus control module configured on the mobile terminal generates the second instruction based on the virus information, and sends to the SMS accessing server the second instruction, and, the SMS accessing server sends to the apparatus the second instruction.

16. The apparatus of claim 9, wherein the first instruction is a power-down instruction, the processor is further to execute the machine readable instructions in the storage to:

receive the power-down instruction sent from the mobile terminal; and, forward the power-down instruction to the computer device, wherein in response to receiving the power-down instruction, the computer device calls a power-down module configured on the computer device to perform the power-down instruction.

\* \* \* \* \*